United States Patent [19]

Müller

[11] Patent Number: 4,596,416
[45] Date of Patent: Jun. 24, 1986

[54] GLOVE COMPARTMENT FOR MOTOR VEHICLE

[75] Inventor: Helmut E. Müller, Rüsselsheim, Fed. Rep. of Germany

[73] Assignee: General Motors Corporation, Detroit, Mich.

[21] Appl. No.: 770,964

[22] Filed: Aug. 30, 1985

[30] Foreign Application Priority Data

Sep. 6, 1984 [DE] Fed. Rep. of Germany ....... 3432739

[51] Int. Cl.⁴ .............................................. B60R 7/06
[52] U.S. Cl. ................................. 296/37.12; 224/282
[58] Field of Search .................. 296/37.12, 37.1, 37.8, 296/70; 180/90; 312/323, 242; 224/282, 42.42, 42.45 R

[56] References Cited

U.S. PATENT DOCUMENTS

| | | | |
|---|---|---|---|
| 2,161,770 | 6/1939 | Visser | 180/90 |
| 3,452,835 | 7/1969 | Deli et al. | 180/90 |
| 4,368,866 | 1/1983 | Urban | 248/286 |

Primary Examiner—Robert B. Reeves
Assistant Examiner—Carol L. Olson
Attorney, Agent, or Firm—Charles E. Leahy

[57] ABSTRACT

A glove compartment in the dashboard of a motor vehicle is closed by a movable door having brackets which carry pins slideably retained in arcuate guide tracks provided in the side walls of the glove compartment. By virtue of the appropriate curvature of guide tracks, the door, while being opened, is able to move along the outer contour of the dashboard and inside of the dashboard. The glove compartment is preferably divided into upper and lower compartments. A spring acts between the compartment and the door and one of the pairs of guide tracks have depressions into which the spring pulls the pins to retain the door in either the fully closed position closing both compartments and a partly closed position opening the upper compartment.

2 Claims, 4 Drawing Figures

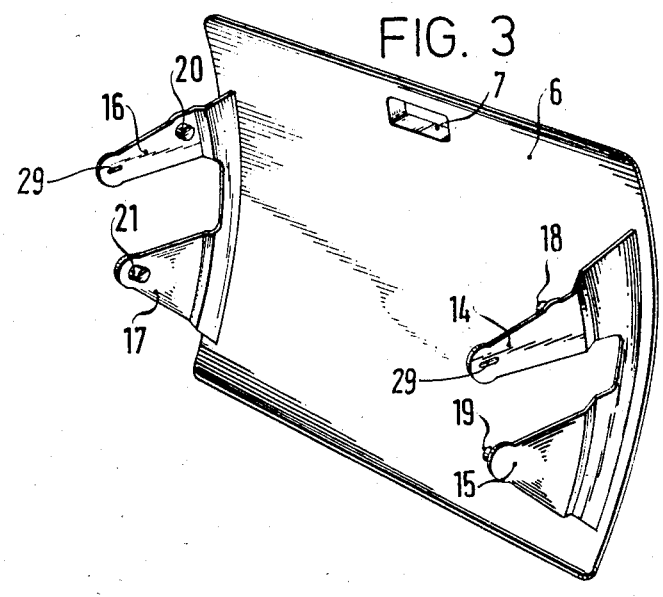
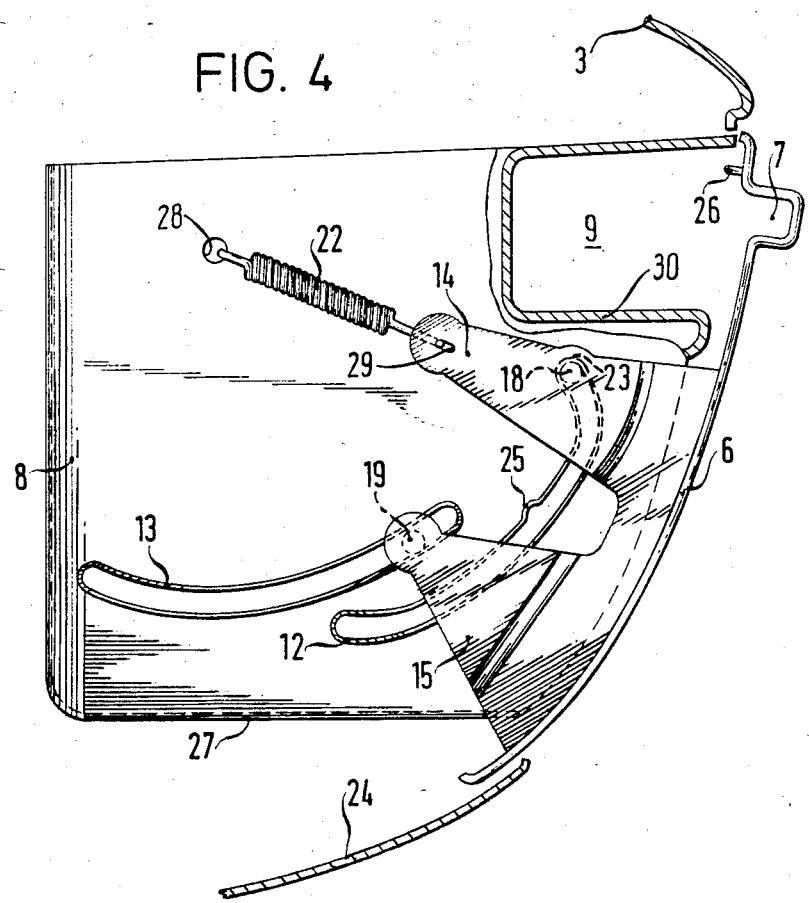

GLOVE COMPARTMENT FOR MOTOR VEHICLE

The invention relates to a motor vehicle with a glove compartment which is built into the dashboard and provided with a door movable between open and closed positions.

BACKGROUND OF THE INVENTION

In prior art vehicles, the door for the glove compartment is mounted for pivoting movement about an axis arranged on the lower edge of the glove compartment. Consequently, when the glove compartment is open, the door protrudes into the occupant compartment of the vehicle and thereby presents an obstruction.

It is the object of the present invention to modify a motor vehicle of the type described above to the effect that when the door of the glove compartment is in the open position it will not project into the occupant compartment. In accordance with the invention, this objective is accomplished in that the door is guided for movement on tracks arranged on both sides of the glove compartment, and is adapted for movement into an open position away from the glove compartment opening, i.e., into a position above or below the glove compartment, rather than into a position that will make it extend into the occupant compartment.

The advantages derived from a glove compartment door arrangement of this type are similar to those that a sliding door has over a hinged door.

When in the open position, the door will not project into the occupant compartment and take up space. The glove compartment door according to the invention, when in the open position, will not cause any obstruction of the occupant if it is adapted for movement into a position inside the dashboard. Only very little space will be occupied by the glove compartment door according to the invention if it is arch-shaped in profile so that its contours correspond to that of the dashboard.

The door arrangement will be relatively simple in structure if the guide tracks are disposed in the side walls of the glove compartment and if the door is provided with pins or small rollers which are adapted to engage into the guide tracks. The path of the door movement can be made to conform relatively close to the contour of the dashboard if two guide tracks are disposed on each side portion and are arranged in a partially overlapping relationship one behind the other.

Another characteristic feature of the invention is that each of the uppermost guide tracks has a first short portion which extends into the direction of the door. This arrangement will provide that the door, at the beginning of the opening movement, is initially lifted off the glove compartment, so that it can be displaced subsequently without rubbing on portions of the glove compartment or the dashboard.

To prevent the door from opening by itself on account of its own weight, the invention proposes that the door be biased in the direction of the closed position by means of at least one tension-type coil spring which extends into the inside of the dashboard. In the case of glove compartments that are partitioned into an upper and a lower shelf, the preferable arrangement is that the guide track be provided with at least one intermediate catch means so that the door can be retained in an intermediate position.

A very cost-effective overall arrangement is one wherein the door is provided on its inner side with laterally spaced apart inwardly directed brackets, two on each side thereof, with each of the brackets being provided with one pin or one little roller, and the tension type coil spring being fastened to the respective ends of the uppermost brackets and extending radially inwardly to the side wall of the glove compartment.

It should be appreciated that a variety of arrangements may be utilized in the practice of the invention. To convey the concept of the invention, one exemplary embodiment is illustrated in the drawings and described in the following.

DESCRIPTION OF THE DRAWINGS

In the drawings,

FIG. 3 is a perspective view of the door of the glove compartment according to FIG. 2;

FIG. 4 is a side elevation view of the glove compartment with the door.

DESCRIPTION OF THE PREFERRED EMBODIMENT

Figure 1:
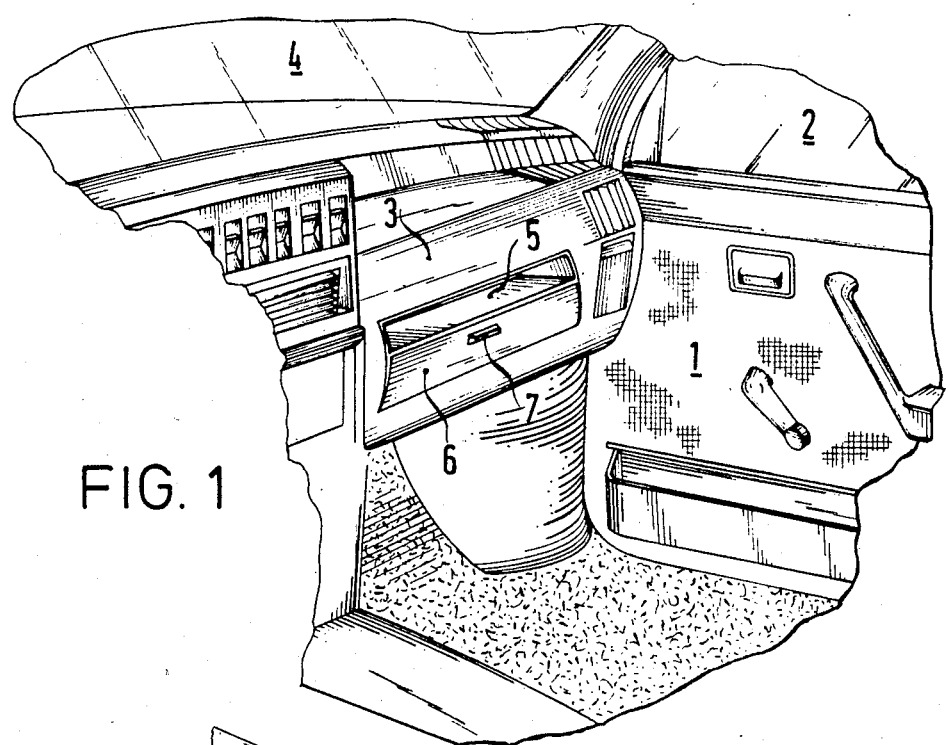
FIG. 1 is a view of the right front portion of the occupant compartment of a vehicle according to the invention.

FIG. 1 illustrates, as viewed from inside the vehicle, part of a door 1 with a side window 2, a dashboard 3 and part of the windshield 4. Inside the dashboard 3 their is provided a glove compartment 3 which can be closed by a door 6. The door 6 is provided with a handle 7. The door 6 is illustrated in FIG. 1 in a semi-open position.

Figure 2:
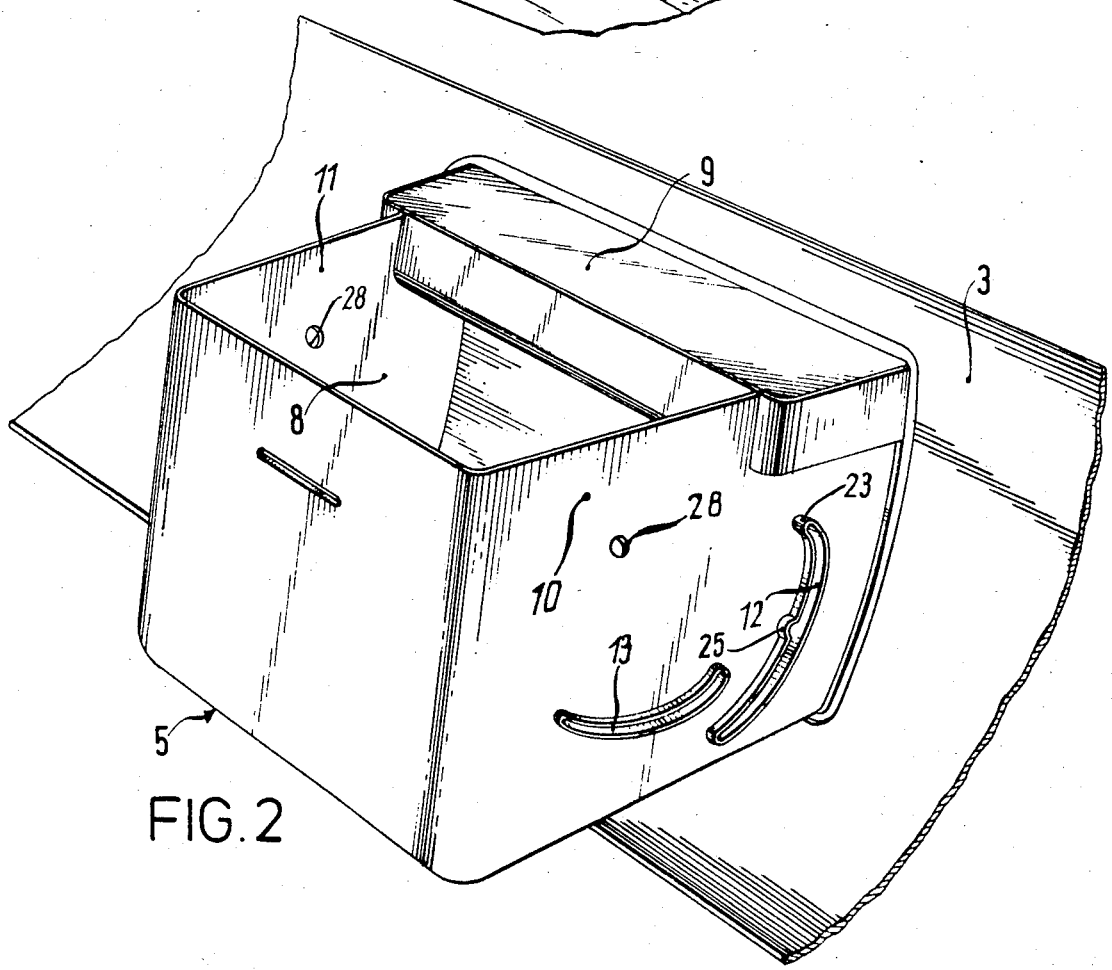
FIG. 2 is a perspective view from the rear of the dashboard to a glove compartment disposed therein.

It is apparent from FIG. 2 that the glove compartment 5 is preferably formed of injection molded plastic, is mounted in the dashboard 3, and is split up into a lower large volume receptacle 8 having a bottom wall 27 and an upper small volume receptacle 9. The small volume receptacle 9 is separately molded and inserted into the large volume receptacle 8 from above, or the receptacles 8 and 9 may be integrally molded. The upper small volume receptacle 9 is not as deep as the large volume receptacle 8. The door 6 is guided in arcuate guide tracks 12 and 13 on the side walls 10 and 11 of the receptacle 8. Only the guide tracks 12 and 13 of the side wall portion 10 is visible in FIG. 2, it being understood that like guide tracks 12 and 13 are molded integrally onto the outside of the side wall portion 11.

In FIG. 3, the configuration of the door 6 is illustrated in detail. The door 6 is preferably molded plastic and has on one side inwardly directed upper and lower brackets 14 and 15 and the other side upper and lower brackets 16 and 17. Each of the brackets 14, 15, 16, and 17 is provided with a pin 18, 19, 20 and 21, respectively, which extend toward one another parallel to the plane of the door 6. The arrangement is such that the pins 18 and 20 in the upper brackets 14 and 16 engage into the guide tracks 12 of the side walls 10 and 11, and the pins 19 and 21 of the lower brackets 15 and 17 extend into the guide tracks 13 of the side walls 10 and 11, so that the door 6 is movably retained in the guide tracks 12 and 13.

The operation of the door 6 during opening and closing is readily apparent from FIG. 4. There, the dashboard 3 is illustrated in cross section, together with the lower large volume receptacle 8 and the upper small volume receptacle 9, as well as the door 6 which, in the position illustrated in FIG. 4, is closing off both receptacles 8 and 9. FIG. 4 also illustrates the two guide tracks 12 and 13 and the two brackets 14 and 15 of the door 6 with their pins 18 and 19 engaged in the guide tracks 12 and 13. It will be understood that the relative shape and location of the arcuate guide tracks 12 and 13 will define the path of movement of the door 6. A radially inwardly directed tension-type coil spring 22 has one end anchored in a hole 28 in the side wall 10 and the other end anchored in a hole 29 provided in the upper bracket 14. The hole 28 is situated at a location positioning the spring 22 generally radially with respect to the arcuate guide track 12 to thereby exert a force on the bracket 14 which will cause the pin 18 to be pulled into an end zone depression 23 of the guide track 12 which extends toward the anchor hole 28 to thereby retain the door in the closed position of FIG. 4. A similar spring, not shown, acts between the side wall portion 11 and the upper bracket 16. A pull of the handle 7 will initially cause, by virtue of the configuration of the track end zone 23 of the guide track 12, the door 6 to be moved rearwardly away from the instrument panel 3. The door 6 can then be swung downwardly and will disappear, in accordance with the path defined by the guide tracks 12 and 13, behind a lower end wall 24 in the dashboard 3, until it has assumed a fully open position below the receptacle 8. A stop member 26 is carried by the door 6 at the upper edge thereof and bears against the bottom wall 27 of the glove compartment 5.

In order to arrange that the door 6 be arrested in a position in which only the small volume receptacle 9 is open, as shown in FIG. 1, the guide track 12 is provided, at the appropriate location, with an intermediate catch depression 25 into which spring 22 will draw the pin 18 of upper bracket 14 when the door 6 reaches the intermediate open position. The guide track 12 on the other side wall portion 11 has a similar catch depression, not shown.

Thus, it is seen that the invention provides a new and improved glove compartment for a motor vehicle. In particular, the glove compartment 5 may be injection molded with the arcuate guide tracks 12 and 13 integrally molded on the outside of the side walls 10 and 11. Likewise, the door 6 is integrally molded with the brackets 14, 15, 16 and 17 integrally molded thereon and also having the pins 18, 19, 20 and 21 integrally molded thereon. Furthermore, the door 6 may be assembled onto the compartment 5 by merely spreading apart the integral brackets 14 and 15 with respect to the brackets 16 and 17 so as to permit the pins to be engaged in their respective guide tracks. Thus, the glove compartment of this invention is exceptionally economical in manufacture and assembly as only a minimum number of parts are required including the injection molded compartment, the injection molded door, and the spring. Furthermore, by the provision of retention depressions 18 and 25 integrally within the guide track 12 means are provided to retain the door 6 in either the fully closed or the partly open positions.

Thus, it is seen that the invention provides a new and improved glove compartment for a motor vehicle.

The embodiments of the invention in which an exclusive property or privilege is claimed are defined as follows:

1. A motor vehicle glove compartment accessible through a dashboard opening comprising:
 a molded plastic compartment fixedly mounted on the dashboard and having laterally spaced apart side walls and a bottom wall defining the floor of the compartment;
 first and second arcuate guide tracks integrally molded on the outside of each of the side walls of the compartment;
 a door having a surface configuration matching the curvature of the dashboard and adapted to close the dashboard opening through which the compartment is accessible;
 upper and lower brackets extending from the door adjacent to both of the side walls of the compartment and respectively carrying first and second pins movably engaged in the first and second arcuate guide tracks so that the arcuate guide tracks define a path of movement of the door;
 spring means acting between at least one of the brackets and the compartment and arranged generally radially with respect to the door; and
 a depressed upper end zone in the guide track receiving the pin at the urging of the spring to establish and retain the door at a normal fully closed position with respect to the compartment.

2. A motor vehicle glove compartment accessible through a dashboard opening comprising:
 a molded plastic compartment fixedly mounted on the dashboard and having laterally spaced apart side walls and a bottom wall defining the floor of a lower compartment and an intermediate floor defining the bottom of an upper compartment;
 first and second arcuate guide tracks integrally molded on the outside of each of the side walls of the compartment;
 a door having a surface configuration matching the curvature of the dashboard and adapted to close the dashboard opening through which the compartment is accessible;
 upper and lower brackets extending from the door adjacent to both of the side walls of the compartment and respectively carrying first and second pins movably engaged in the first and second arcuate guide tracks so that the arcuate guide tracks define a path of movement of the door;
 spring means acting between at least one of the brackets and the compartment and arranged generally radially with respect to the door; and
 a depressed upper end zone in the guide track receiving the pin at the urging of the spring to establish and retain the door at a normal fully closed position with respect to the upper and lower compartments; and
 an intermediate depression provided in the guide track adapted to receive the pin under the influence of the spring to retain the door at an intermediate position along its path of movement thereby opening only the upper compartment while closing the lower compartment.

* * * * *